July 23, 1940.  H. J. SCHRADER  2,208,648
DEVICE FOR MEASURING TORSIONAL VIBRATION
Filed May 11, 1939
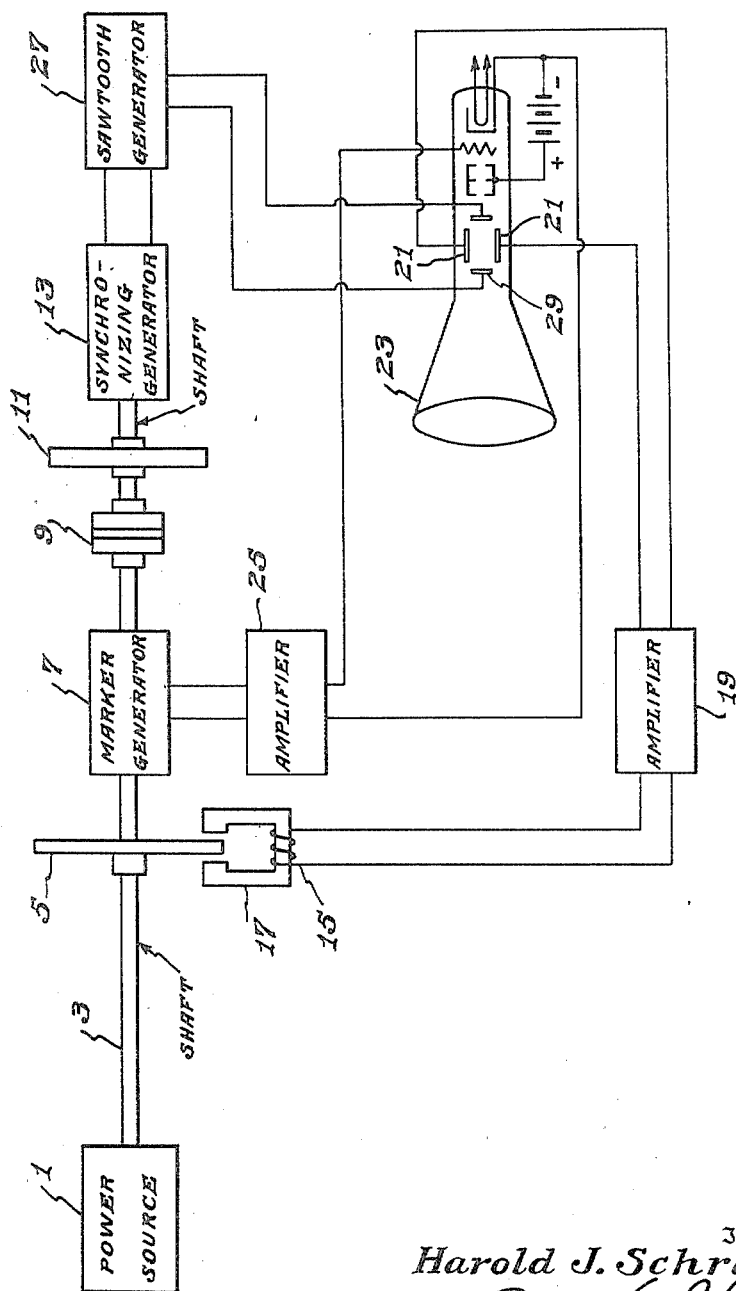
Inventor
Harold J. Schrader
By
Attorney Patented July 23, 1940

2,208,648

UNITED STATES PATENT OFFICE 2,208,648

DEVICE FOR MEASURING TORSIONAL VIBRATION

Harold J. Schrader, Haddon Heights, N. J., assignor to Radio Corporation of America, a corporation of Delaware Application May 11, 1939, Serial No. 272,997

4 Claims. (Cl. 73—51)

This invention relates to a device for and a method of measuring torsional vibration. It has been previously proposed to measure torsional vibration by connecting alternators to the opposite ends of the shaft whose vibration is to be studied. The phase of the currents of the two alternators is an indication of the torsional vibration. This method is sometimes abjectionable because it is not always convenient to connect the alternators to the opposite ends of the shaft and it is also apparent that the method does not lend itself readily to measuring the amplitude of the torsional movements.

An object of the present invention is to provide means for measuring torsional vibration. A still further object is to provide means for measuring torsional vibration, its amplitude and the angular position at which the vibration occurs.

The invention will be described by reference to the accompanying figure which illustrates schematically one embodiment of the invention.

Referring to the figure, a source of power 1, which may be an internal combustion motor, electric motor or any source of power, is connected to a shaft 3. A solid disc 5 is secured to the end of the shaft 3. The disc is composed of a nonmagnetic material, such as aluminum, brass, or copper. The metal should be of a homogeneous nature to avoid irregularities in operation. The shaft 3 is also connected to a marker generator 7 and through a flexible coupling 9 to a flywheel 11 and synchronizing generator 13.

The electrical connections are as follows: The winding 15 of a permanent magnet 17 which is suitably positioned with respect to the disc 5 is connected through an amplifier 19 to the vertical deflecting elements 21 of a cathode ray tube 23. The marker generator is connected through an amplifier 25 to the control electrode and cathode of the cathode ray tube. The synchronizing generator 13 is connected to a saw-tooth generator 27 which is in turn connected to the horizontal deflecting electrodes 29 of the cathode ray tube.

The operation of the device is essentially as follows: When the shaft is rotating at a constant speed and without torsional vibration no currents are induced in the winding 15 and therefore no vertical deflection occurs in the cathode ray trace formed on the fluorescent screen of the cathode ray tube. The marker generator may be used for generating pulses one or more times per revolution of the shaft at predetermined positions of said shaft and for applying said pulses to the grid of the cathode ray tube to interrupt said cathode ray and to indicate thereby said angular positions of the shaft 3. The flexible coupling drives the flywheel and synchronizing generator at constant speed so that the saw-tooth generator causes a deflection in a horizontal direction which is synchronized with the rotation of the shaft.

If torsional vibration occurs, the eddy currents which are induced in the disc react on the permanent field of the magnet 17 and thereby induce a voltage in the field winding 15. This voltage is proportional to the rate of change of rotation and directly proportional to the amplitude of torsional vibration. The induced voltages will cause a vertical deflection of the cathode ray trace. The position of the vertical deflection will indicate the angular position at which torsional vibration takes place and the amplitude of the vertical deflection will indicate the amplitude of the torsional vibration. It should be understood that the flexible coupling and the flywheel will act as an effective filter to prevent or minimize the effect of the torsional vibration on the synchronizing generator.

Thus the invention has been described as a device for indicating torsional vibration in terms of the angular position of the shaft and the amplitude of such vibration. A reference indication may be obtained by suitably connecting a marker generator and a synchronizing generator to the shaft. The effects of the torsional vibration on the synchronizing generator are minimized by a flexible coupling and a flywheel. It should be understood that the marker generator may be omitted or may be connected to the deflecting electrodes instead of the control electrode. One suitable marker generator is disclosed in U. S. Patent No. 2,082,030, which issued June 1, 1937, to Harold J. Schrader and Gilbert Swift.

Furthermore, it should be understood that a voltmeter having suitable characteristics may be substituted for the cathode ray indicator for determining amplitude of torsional vibration.

I claim as my invention:

1. In a device for measuring torsional vibration of a rotating shaft, a generator responsive substantially solely to said vibration, means connecting said generator to a shaft whose vibrations are to be studied, a synchronizing generator, means including a flexible coupling and a flywheel adapted to substantially eliminate the effects of torsional vibration of said rotating shaft on said synchronizing generator connecting said synchronizing generator to said shaft, a cathode ray tube having pairs of deflecting elements, means connecting one of said pairs to said first-mentioned generator, and means connecting the second of said pairs to said synchronizing generator.

2. A torsional vibration indicator for studying the rotational movements of a shaft, including a generator coupled to said shaft and responsive to changes in rotation of said shaft, a synchronizing generator, means connecting said synchronizing generator to said shaft, said means being relatively unresponsive to vibrations of said shaft, a cathode ray tube including deflecting means and means connected to the first-mentioned generator and to said cathode ray deflecting means, and means connecting said synchronizing generator to other deflecting means of said cathode ray tube whereby the cathode ray is deflected along one coordinate as a function of the synchronizing generator and along another coordinate in response to torsional vibrations of said shaft.

3. In a device of the character of claim 1, a marker generator connected to said shaft and to said cathode ray tube for indicating angular positions of said shaft.

4. In a device of the character of claim 2, a marker generator connected to said shaft and to said cathode ray tube for indicating angular positions of said shaft.

HAROLD J. SCHRADER.